US010072178B2

(12) United States Patent
Webster et al.

(10) Patent No.: US 10,072,178 B2
(45) Date of Patent: Sep. 11, 2018

(54) BIOBASED CYCLIC CARBONATE FUNCTIONAL RESINS AND POLYURETHANE THERMOSETS THEREFROM

(71) Applicant: NDSU RESEARCH FOUNDATION, Fargo, ND (US)

(72) Inventors: Dean C. Webster, Fargo, ND (US); James A. Docken, Jr., Fargo, ND (US); Satyabrata Samanta, S.Fargo, ND (US); James A. Bahr, West Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 177 days.

(21) Appl. No.: 15/133,813

(22) Filed: Apr. 20, 2016

(65) Prior Publication Data

US 2016/0312060 A1    Oct. 27, 2016

Related U.S. Application Data

(60) Provisional application No. 62/150,589, filed on Apr. 21, 2015.

(51) Int. Cl.
*C08G 73/10* (2006.01)
*C09D 175/12* (2006.01)
(Continued)

(52) U.S. Cl.
CPC ......... *C09D 175/12* (2013.01); *C08G 59/027* (2013.01); *C08K 5/0025* (2013.01); *C08K 5/17* (2013.01); *C08K 5/3462* (2013.01)

(58) Field of Classification Search
CPC ......... C09D 175/12; C08G 59/02; C08K 5/17
(Continued)

(56) References Cited

U.S. PATENT DOCUMENTS 8,088,244 B2 * 1/2012 Burckhardt ........ C08G 18/0885
156/325
9,439,433 B2 * 9/2016 Looper ................. C07C 271/20
(Continued)

FOREIGN PATENT DOCUMENTS

WO    WO 2011/097484 A1 *  8/2011  ............. C08G 65/02

OTHER PUBLICATIONS

Boyer et al. "Solubility in CO2 and carbonation studies of epoxidized fatty acid diesters: towards novel precursors for polyurethane synthesis", Green Chem., 2010, 12, 2205-2213. (Oct. 2010). (Year: 2010).*

(Continued)

*Primary Examiner* — Jane L Stanley
(74) *Attorney, Agent, or Firm* — J.A. Lindeman & Co., PLLC

(57) ABSTRACT

The invention relates to a resin having a plurality of cyclic carbonate groups comprising the reaction product of: a) an epoxidized sucrose fatty acid ester resin, and b) carbon dioxide where a) and b) are reacted under conditions sufficient to carbonylate a plurality of the oxirane groups of the epoxidized sucrose fatty acid ester resin, and optionally in the presence of a catalyst or of a solvent. In one embodiment the epoxidized sucrose fatty acid ester resin is epoxidized sucrose soyate. The invention also relates to methods for producing a resin having a plurality of cyclic carbonate groups. In a method of the invention, an epoxidized sucrose fatty acid ester resin is contacted with carbon dioxide under conditions sufficient to carbonylate a plurality of the oxirane groups of the epoxidized sucrose fatty acid ester resin, and optionally in the presence of a catalyst or of a solvent. Other embodiments of the invention relate to curable composition containing a) a resin having a plurality of cyclic carbonate groups; b) an alkyl amine curing agent having two or more (Continued)

reactive amine groups; and c) optionally, a catalyst; and cured compositions and articles.

18 Claims, 9 Drawing Sheets

(51) Int. Cl.
*C08G 59/02* (2006.01)
*C08K 5/17* (2006.01)
*C08K 5/00* (2006.01)
C08K 5/3462 (2006.01)

(58) Field of Classification Search
USPC ............................................. 524/600
See application file for complete search history.

(56) References Cited

U.S. PATENT DOCUMENTS

| 9,839,219 B2* | 12/2017 | Looper | A01N 33/04 |
| 2012/0259087 A1* | 10/2012 | Cramail | C07D 317/36 |
| | | | 528/229 |

OTHER PUBLICATIONS

Foltran et al. "Solubility in CO2 and swelling studies by in situ IR spectroscopy of vegetable-based epoxidized oils as polyurethane precursors", Polym. Chem. 2012, 3, 525-532. (Dec. 2012). (Year: 2012).*

Maisonneuve et al. "Structure-properties relationship of fatty acid-based thermoplastics as synthetic polymer mimics", Polym. Chem., 2013, 4, 5472-5517. (Nov. 2013). (Year: 2013).*

* cited by examiner

BIOBASED CYCLIC CARBONATE FUNCTIONAL RESINS AND POLYURETHANE THERMOSETS THEREFROM

CROSS-REFERENCE TO RELATED APPLICATIONS

This application claims priority under 35 USC § 119 to US Patent Application No. 62/150,589, filed Apr. 21, 2015, which is incorporated herein by reference.

STATEMENT OF US GOVERNMENT SUPPORT

This invention was made with government support under IIA-1355466 awarded by the National Science Foundation (NSF). The US government has certain rights in the invention.

FIELD OF THE INVENTION

This invention relates to the field of functionalized bio-based resins and curable compostions containing bio-based resins. More particularly, this invention relates to novel biobased resins containing a high number of cyclic carbonate groups.

BACKGROUND OF THE INVENTION

Thermosetting polymers and composites have been widely used in modern industry because of their low density, good mechanical properties, low cost, dimensional stability, and so on. Important monomers and oligomers for thermosets include unsaturated polyester, epoxy resin, vinyl ester, phenol-formaldehyde resin, melamine resin, etc. Traditionally, most of these resins have been synthesized using petroleum-based chemicals as the raw materials. However, due to the foreseeable limit of fossil feedstocks and the increasing environmental concerns, the polymer and composites industry is suffering from potential increasing cost and environmental regulations. Therefore, much effort has been devoted lately to develop polymers and composites from bio-renewable raw materials. See Wool et al., *Biobased Polymers and Composites*, Elsevier, Amsterdam (2005); Belgacem et al., *Monomers, Polymers, and Composites from Renewable Resources*, Elsevier, Amsterdam (2008); Raquez et al., *Prog. Polym. Sci.* 35:487-509 (2010). The fluctuating price of petroleum-based products and stricter environmental rules and regulations increases the demand for bio-based products. Compared to petroleum-based products, bio-based products are environmentally friendly, sustainable, and versatile in use. See Deka et al., *Progress in Organic Coatings* 66:192-192 (2009). In 2004, the world production from major oils totaled 380 million metric tons. Production has continued to rise at a rate of 3-4% per year with soybean oil the major oil produced. See Behera et al., *Journal of Applied Polymer Science* 109:2583-2590 (2008).

Plant oils are one of the most important bio-renewable chemical feedstocks for the polymer industry because of their high annual production, high availability, low toxicity, relatively low cost, and biodegradability. Plant oils and their derivatives have been widely used for the production of paints and coatings since the development of drying oil resins, taking advantage of the autoxidation crosslinking of the double bonds in the fatty acid chains. See Meier et al., *Chem. Soc. Rev.* 36:1788-1802 (2007); Xia et al., *Green Chem.* 13:1983-1909 (2010). During the last decade, a variety of plant oil-based polymers have been developed via free radical or cationic homo-polymerization, as well as copolymerization with petroleum-based monomers, such as styrene and divinylbenzene. See Lu et al., *ChemSusChem* 2:136-147 (2009); Li et al., *Biomacromolecules* 4:1018-1025 (2003); Kundu et al., *Biomacromolecules* 6:797-806 (2005); Henna et al., *J. Appl. Polym. Sci.* 104:979-985 (2007); Valverde et al., *J. Appl. Polym. Sci.* 107:423-430 (2008); Andjelkovic et al., *Polymer* 46:9674-9685 (2005); Andjelkovic et al., *Biomacromolecules* 7:927-936 (2006); Lu et al., *Biomacromolecules* 7:2692-2700 (2006). Biobased vegetable oils (e.g., soybean oil) contain triglycerides that are composed of three unsaturated fatty acid chains joined at a glycerol junction. See Fu et al., *Journal of Applied Polymer Science* 117:2220-2225 (2010). However, due to the relatively low reactivity of the double bonds in the fatty acid chain, some chemical modifications are usually needed to introduce reactive functional groups having higher reactivity. A widely explored method for the modification of plant oils involves the conversion of the double bonds to epoxy groups by using peracids and hydrogen peroxides. With the epoxidation, polymerization occurs quickly with highly cross linked networks. See Behera et al., *Journal of Applied Polymer Science* 109:2583-2590 (2008); Kolot et al., *Journal of Applied Polymer Science* 91:3835-3843 (2003). Epoxidized plant oils have been utilized for coatings and composites by using conventional epoxy curing agents, such as amine and anhydride. However, the internal epoxy groups in epoxidized plant oils are much less reactive than the terminal epoxy groups in benchmark materials, for example bisphenol-A epoxy. Therefore, epoxidized plant oils have been further modified via the ring-open reaction of epoxy with unsaturated acids or alcohols to produce (meth) acrylated plant oils or plant oil-based polyols. These derivatives have been widely used to generate thermosets by free radical cure or hydroxyl-isocyanate reactions. See Wu et al., *Polym. Int.* 60:571-575 (2011); Lu et al., *Polymer* 46:71-80 (2005); La Scala et al., *Polymer* 46:61-69 (2005); Can et al., *J. Appl. Polym. Sci.* 81:69-77 (2001); Pfister et al., *ChemSusChem* 4:703-717 (2011); Desroches et al., *Polym. Rev.* 52:38-79 (2012); Lu et al., *Biomacromolecules* 8:3108-3114 (2007); Lu et al., *ChemSusChem* 3:329-333 (2010); Petrovic, *Polym. Rev.* 48:109-155 (2008). Besides epoxidization, plant oils have also been modified by hydroformylation (see Petrovic et al., *Polym. Int.* 57:275-281 (2008); Petrovic et al., *Eur. J. Lipid Sci. Technol.* 112:97-102 (2010)) and thiol-ene reactions (see Meier et al., *Macromol. Rapid Commun.* 31:1822-1826 (2010); Turunc et al., *Green Chem.* 13:314-320 (2011); Wu et al., *ChemSusChem* 4:1135-1142 (2011)).

Vegetable oils have been modified using maleinization, epoxidation, acrylation, and hydroxomethylation. See Fu et al., *Journal of Applied Polymer Science* 117:2220-2225 (2010). Epoxidation and acrylation are the most common forms of modification of soybean oils with acrylated soybean oils (ASO) being the most prevalent. See Bunker et al., *Journal of Oil and Colour Chemists's Association* 83:460 (2000). Soybean oils have a wide distribution of functional groups, 0-9 polymerizable groups per molecule. Thus, allowing for substances to react readily to them. The double bonds and highly reactive end groups allows for free radical polymerization to occur. See Fu et al., *Journal of Applied Polymer Science* 117:2220-2225 (2010); Behera et al., *Journal of Applied Polymer Science* 109:2583-2590 (2008). Acrylated soybean oils (ASO) are used to form solvent-free curing of films, adhesives, coatings, inks, and varnishes. Acrylation of epoxidized soybean oil, will lead to great improvement of photoactivity because of the short time it takes to form crosslinks under ultraviolet radiation. See Pelletier et al., *Journal of Applied Polymer Science* 99:3218-3221 (2005).

The biggest obstacle in the application of plant oils for the generation of polymers is the flexibility of the fatty acid chain, which leads to low glass transition temperature ($T_g$)

and low mechanical properties such as modulus and hardness. Thus, plant oils cannot be used by themselves as structural and engineering materials. To overcome these limitations, petroleum-based monomers (for example styrene) are usually introduced to reinforce plant oil-based polymers, but the bio-renewable content is sacrificed to achieve the desired material properties in this approach. See Li et al., *Biomacromolecules* 4:1018-1025 (2003); Khot et al., *J. Appl. Polym. Sci.* 82:703-723 (2011).

Sucrose is a bio-renewable polyol that is naturally present in a variety of plants. Sucrose ester is a vegetable oil composed of sucrose and fatty acids that is frequently used as a bio-based curable material for decades. See Jinli et al., *Chinese Journal of Chemical Engineering* 17:1033-1037 (2009). The fatty esters of sucrose were first explored as a coating resin in 1960's. See Bobalek et al., *Official Digest* 33:453-468 (1961); Walsh et al., *Div. Org. Coatings Plastic Chem.* 21:125-148 (1961). However, a high degree of substitution of sucrose with fatty acids had not been achieved until an efficient process was developed by Procter & Gamble (P&G) Chemicals in 2002. See U.S. Pat. Nos. 6,995,232; 6,620,952; 6,887,947. In spite of a relatively high degree of substitution (average of 7.7 fatty acid chains per molecule) and moderate molecular weight (around 2,400 g/mol), sucrose esters of fatty acids have low viscosity (300-400 mPa·s) due to their compact architectures. Highly substituted sucrose esters of fatty acids (SEFAs) have been successfully commercialized under the brand Sefose®, and utilized as a diluent in alkyd resins by CCP. Furthermore, SEFAs are a highly tunable platform such that a variety of derivatives and formulations with different properties and application can be developed, since many of the modification approaches for plant oils are applicable to sucrose esters.

Recently, Pan et al. reported the synthesis of a series of thermosets based on SEFAs. Epoxidized sucrose esters of fatty acids (ESEFAs) were prepared via epoxidization, and cured using cyclic anhydrides. See Pan et al., *Green Chem.* 13:965-975 (2011); Pan et al., *Biomacromolecules* 12:2416-2428 (2011); Pan et al., *Macro. Rapid Comm.* 32:1324-1330 (2011). Esterification of sucrose with soybean oil provides sucrose soyate, which is rigid through the sucrose core. Functionality may be achieved via transformations on the double bond of the fatty acid chains. For example, the double bond may be epoxidized to form epoxidized sucrose soyate, which may be represented by the following structure:

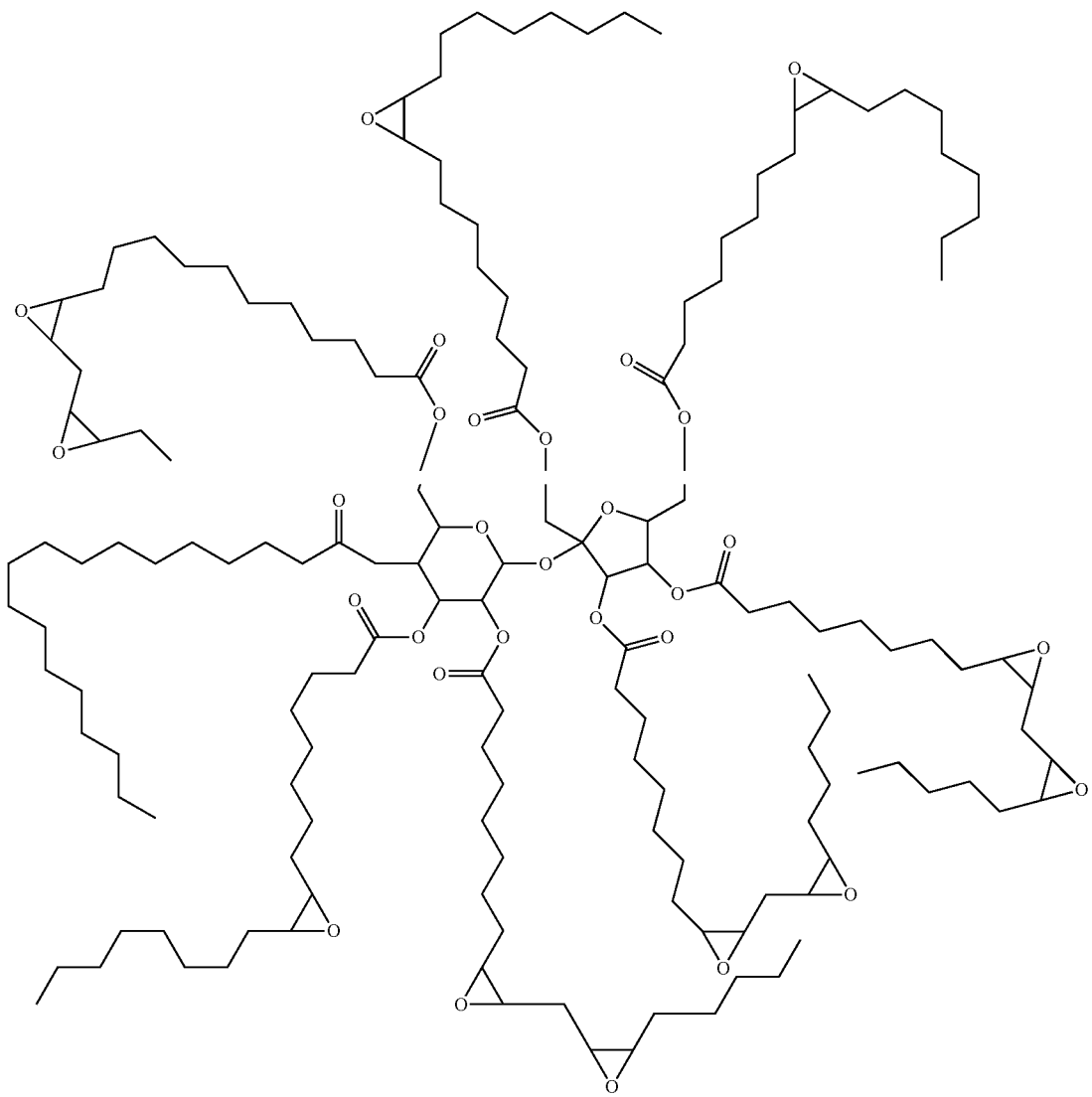 [SMILES: CCCCCCCCCCCCCCCCCC(=O)CC1C(COC(=O)CCCCCCCCCCC2OC2CC2OC2CC)OC(OC2(COC(=O)CCCCCCCC3OC3CCCCCCCC)OC(COC(=O)CCCCCCCC3OC3CCCCCCCC)C(OC(=O)CCCCCCCC3OC3CC3OC3CCCCC)C2OC(=O)CCCCCCCC2OC2CC2OC2CCCCC)C(OC(=O)CCCCCCCC2OC2CC2OC2CCCCC)C1OC(=O)CCCCCCCC1OC1CCCCCCCC]

Even with these developments, there remains a need for additional bio-based resins that expand the number and utility of currently known bio-based resins by introducing new functionality and functional groups. This invention answers that need.

SUMMARY OF THE INVENTION

This invention relates to novel biobased resins containing a high number of cyclic carbonate groups. The resins of the invention are prepared from epoxidized sucrose fatty acid esters, such as those described in published PCT application WO 2011/097484. The cyclic carbonate resins of the invention can be crosslinked with multifuntional amines to yield crosslinked polyurethane coatings without the use of isocyanates, which are considered to be hazardous. The thermosets can be used in various compositions, such as coatings, composites, adhesives, etc.

In one embodiment the invention relates to a bio-based resin having a plurality of cyclic carbonate groups comprising the reaction product of: a) an epoxidized sucrose fatty acid ester resin, and b) carbon dioxide where a) and b) are reacted under conditions sufficient to carbonylate a plurality of the oxirane groups of the epoxidized sucrose fatty acid ester resin and optionally in the presence of a catalyst or of a solvent. In one embodiment the epoxidized sucrose fatty acid ester resin is epoxidized sucrose soyate (ESS).

In another embodiment the invention relates to a method for producing a resin having a plurality of cyclic carbonate groups. In a method of the invention, an epoxidized sucrose fatty acid ester resin is contacted with carbon dioxide under conditions sufficient to carbonylate a plurality of the oxirane groups of the epoxidized sucrose fatty acid ester resin, and optionally in the presence of a catalyst or of a solvent.

Other embodiments of the invention relate to a curable composition containing a) a resin having a plurality of cyclic carbonate groups; b) an alkyl amine curing agent having two or more reactive amine groups; and c) optionally, a catalyst. Another embodiment of the invention is the cured composition.

DESCRIPTION OF THE INVENTION

This invention relates to novel biobased resins containing a high number of cyclic carbonate groups. Unlike current commercial polyurethane systems, the biobased resins with a high content of cyclic carbonate groups of the invention can be reacted with amines to form polyurethanes using a non-isocyanate route, and thus are safer than current systems.

In one embodiment the invention relates to a bio-based resin having a plurality of cyclic carbonate groups comprising the reaction product of: a) an epoxidized sucrose fatty acid ester resin, and b) carbon dioxide where a) and b) are reacted under conditions sufficient to carbonylate a plurality of the oxirane groups of the epoxidized sucrose fatty acid ester resin and optionally in the presence of a catalyst or of a solvent. In one embodiment the epoxidized sucrose fatty acid ester resin is epoxidized sucrose soyate (ESS).

Biobased resins with a high content of cyclic carbonate groups of the invention are synthesized from the reaction of epoxidized sucrose fatty acid ester resin with carbon dioxide. The resins of the invention are prepared from epoxidized sucrose fatty acid esters, such as those described in WO 2011/097484, which is incorporated herein by reference. As described in WO 2011/097484, epoxidized sucrose fatty acid ester resins derived from different vegetable oils (coconut oil, corn oil, castor oil, soybean oil, safflower oil, sunflower oil, linseed oil, tall oil fatty acid, tung oil, vernonia oil, etc.) can be used in the invention. In a preferred embodiment, the epoxidized sucrose fatty acid ester of soybean oil (epoxidized sucrose soyate) is used.

The epoxide groups of the epoxidized sucrose fatty acid ester may be fully carbonylated, that is converted to cyclic carbonate groups, where substantially all of the epoxide groups have been carbonylated, or it may be partially carbonylated, where only a fraction of the available epoxide groups have been carbonylated, for example, 25%-90% converted. In one embodiment, epoxidized sucrose soyate, for example, may be carbonylated such that 25%, 50%, 75%, or 90% of the epoxide groups have been converted to cyclic carbonate groups. It is understood in the art that some residual epoxide groups may remain even when full carbonylation is desired.

Figure 1:
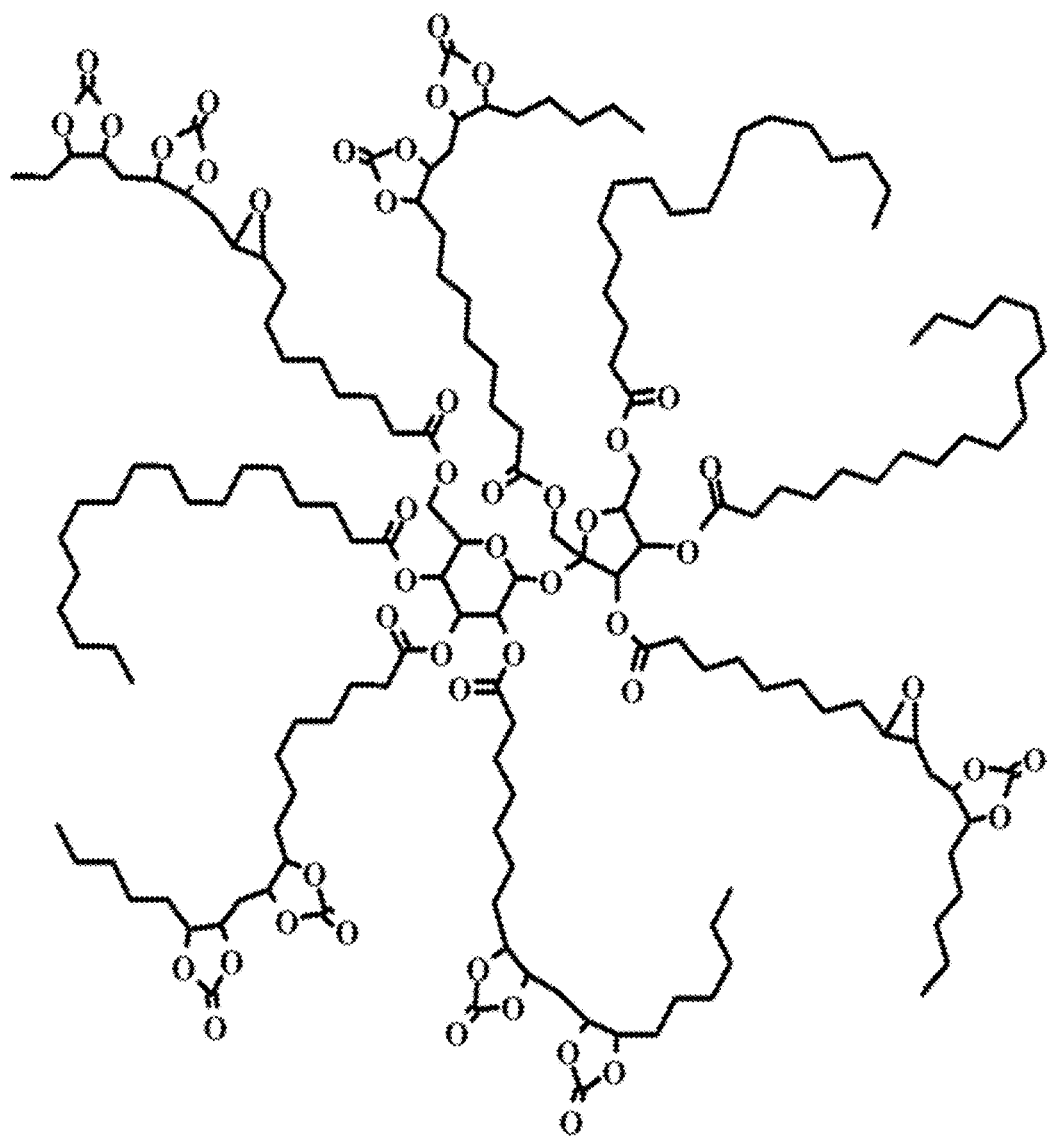
FIG. 1 depicts an example structure of a carbonated sucrose soyate resin.

According to the invention, a plurality of the oxirane groups of the epoxidized sucrose fatty acid ester resin, such as epoxidized sucrose soyate (ESS), is carbonated with carbon dioxide to form carbonated sucrose soyate (CSS). See FIG. 1.

In another embodiment, the invention relates to a method for producing a resin having a plurality of cyclic carbonate groups. In a method of the invention, an epoxidized sucrose fatty acid ester resin is contacted with carbon dioxide under conditions sufficient to carbonylate a plurality of the oxirane groups of the epoxidized sucrose fatty acid ester resin, and optionally in the presence of a catalyst or of a solvent. A desired degree of partial carbonylation may be achieved by using less than the stoichiometric equivalent amount of carbon dioxide to oxirane groups, reducing the pressure of carbon dioxide in the reaction, or stopping the reaction at a time to achieve the desired degree of carbonylation, while full or substantially full carbonylation may be achieved by using a stoichiometric equivalent or an excess of carbon dioxide.

Any catalyst and/or solvent known in the art may optionally be used to increase the speed and/or amount of the carbonation of the oxirane groups. For example, epoxidized sucrose soyate may be carbonated in a one-pot synthesis using a solvent, such as toluene, an alkyl ammonium salt catalyst such as tetra-butyl ammonium bromide, and carbon dioxide.

The carbonated sucrose fatty acid ester resins of the invention may be used to form a thermosetting resin composition. As is known in the art thermosetting resins change into an infusible, insoluble polymer network by curing which can be induced by the action of heat, suitable radiation, or both. A cured thermosetting resin is typically referred to as a thermoset.

Figure 2:
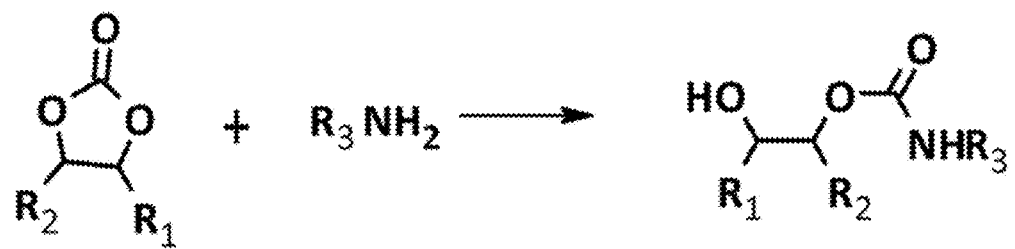
FIG. 2 depicts the curing reaction of a cyclic carbonate reacting with a primary amine.

According to the invention, a plurality of the cyclic carbonate groups of the carbonated sucrose fatty acid ester resin, for example, carbonated sucrose soyate, can be reacted with alkyl amines having two or more reactive amine groups, such as aminoethylpiperazine (AEP) and bis(4-aminocyclohexyl)methane (PACM), and, optionally, a catalyst, to yield hydroxyl alkyl carbamates (urethanes). See FIG. 2, where the carbonated epoxidized sucrose fatty acid ester resin is represented by the $R_1$, $R_2$ cyclic carbonate. Thus, the cyclic carbonate resins of the invention can be cured to form polyurethane thermoset resins from the reaction with multifunctional alkyl amine curing agents. Accordingly, one embodiment of the invention relates to curable composition containing a) a resin having a plurality of cyclic carbonate groups; b) an alkyl amine curing agent having two or more reactive amine groups; and c) optionally, a catalyst.

Amine curing agents known in the art include, for example, diethylenetriamine, triethylenetetramine, tetraethylene-pentamine, etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine; 1-ethyl-1,3-propanediamine; 2,2 (4),4-trimethyl-1,6-hexanediamine; N,N-bis(3-aminopropyl)ethylenediamine; 2,4(6)-toluenediamine; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclohexane; 1,2-diamino-4-cyclohexylcyclohexane; isophoronediamine; norbornanediamine; 4,4'-diaminodicyclohexylmethane; 4,4'-diaminodicyclohexylethane; 4,4'-diaminodicyclohexylpropane; 2,2-bis(4-aminocyclohexyl) propane; 3,3'-dimethyl-4,4'-diaminodicyclohexylmethane; 3-amino-1-(4-aminocyclohexyl)propane; 1,3- and 1,4-bis (aminomethyl)cyclohexane; and 1-cyclohexyl-3,4-diminocyclohexane.

Suitable amine-epoxide adducts useful as amine curing agents include, for example, reaction products of diamines, such as ethylenediamine, diethylenetriamine, triethylenetetramine, m-xylylenediamine and/or bis(aminomethyl)cyclohexane with terminal epoxides, such as the polyglycidyl ethers of the polyhydric phenols listed above.

Polyamide resins can also serve as amine curing agents for the resins. Suitable polyamide reins include those prepared through the reaction product of multifunctional amines with diacids. Dimer fatty acids are the most commonly used diacids for the synthesis of polyamide resins.

Preferred amine curing agents include 4,4'-bisaminocyclohexyl methane (PACM), amino ethyl piperazine (AEP), isophorone diamine, tris(2-aminoethyl)amine, triaminononane as well as polyamide resins and polyamine resins. Most preferred amine curing agents are the multifunctional primary amines such as tris(2-aminoethyl)amine and triaminononane.

The cured compositions can be used in various compositions, such as coatings, composites, adhesives, etc. Accordingly, the invention also relates to curable coating compositions which may be formulated with or without solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

A curable coating composition according to the invention may also comprise a pigment (organic or inorganic) and/or other additives and fillers known in the art. For example, a coating composition of the invention may further contain coating additives. Such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Curing may be effected at ambient conditions or elevated temperatures from 50° C. to 150° C. Preferred curing temperatures are ambient conditions to 100° C. Another embodiment of the invention is therefore a cured composition, such as a coating or coated substrate, or an article produced from the curable composition.

EXAMPLES

Methods: The following methods are used in the examples for the characterization of the compounds synthesized and materials prepared.

Gel permeation chromatography (GPC) was performed on a Symyx Rapid GPC. Polystyrene standards were used for calibration. A 1.5% sample solution in THF using a flow rate of 1 ml/min was used.

Matrix Assisted Laser Desorption/Ionization—Time of Flight (MALDI-TOF) was performed on a Waters MALDI Synapt G2-Si high definition mass spectrometer.

FTIR measurements were done by a Bruker Optics Vertex 70 FTIR spectrometer. Spectra acquisitions were based on 32 scans with data spacing of 4.0 cm$^{-1}$ in the range of 4000-500 cm$^{-1}$.

Proton Nuclear Magnetic Resonance ($^1$H-NMR) was performed on a Bruker Optics 400 MHz spectrometer using 16 scans. All measurements were made using CDCl$_3$ as solvent.

The bulk viscosities of samples were measured using a Brookfield Viscometer (DV-II+Pro) at 21° C.

The densities of samples were measured using a BYK-Gardner Weight Per Gallon Cup at 25° C., referring to ASTM D 1475. The Midget Cup having a capacity of 8.32 grams of water at 25° C. was used. The net weight of the fluid sample in grams equals the sample's density in pounds per U.S. gallon, which is converted into grams/mL.

A DSC 01000 from TA Instruments (New Castle, Del.) with an auto sampler was used for glass transition temperature ($T_g$) determination. Samples were subjected to a heat-cool-heat cycle from −90 to +100° C. by ramping at 10° C./min for both heating and cooling cycles. The second heating cycle was used to characterize the samples.

Epoxide equivalent weight (EEW, g/eq.) of the epoxy products was determined by epoxy titration according to ASTM D 1652.

Impact test were measured according to ASTM D 2794 using a BYK-Gardner Heavy Duty Impact Tester Model IG-1120, with a 1.8 kg (4 lb) mass and 1.27 cm (0.5 in) diameter round-nose punch.

A BYK-Gardner pendulum hardness tester was used to measure the König pendulum hardness of the cured film in accordance with ASTM D 4366.

MEK double rubs of the cured film was done in accordance with ASTM D 5402.

The film thickness was measured with a Byko-test 8500.

König pendulum hardness and pencil hardness were measured using ASTM D 4366-95 and ASTM D 3363-00, respectively.

The adhesion of coatings on steel substrate was evaluated using crosshatch adhesion ASTM D 3359-97.

Mandrel bend test was carried out based on ASTM D 522, and the results were reported as the elongation range of coating at cracking.

Dynamic mechanical properties of thermosetting films were measured in tension mode using 0800 DMA from TA Instruments (New Castle, Del.). Rectangular specimens with dimensions of 20 mm length, 5 mm width, and 0.10-0.16 mm thickness were prepared. The measurements were performed from −110 to 200° C. at a heating rate of 5° C./min and frequency of 1 Hz. The glass transition temperature ($T_g$) was determined as the temperature at the maximum of tan δ vs. temperature curve. The storage modulus (E') in the rubbery plateau region was determined at generally 60° C. above the glass transition temperature. The crosslink density ($v_e$) of thermoset was calculated using E' in the rubbery plateau region by the following equation, derived from the theory of rubber elasticity: where E' is the storage modulus of the thermoset in the rubbery plateau region at $T_g$+60° C., R is the gas constant, and T is the absolute temperature.

$$E' = 3v_e RT$$

Example 1—Carbonated Sucrose Soyate

A carbonated sucrose soyate (CSS) of the invention was prepared by carbonating epoxidized sucrose soyate (ESS) using carbon dioxide. The ESS, toluene (solvent), and catalyst (tetrabutyl ammonium bromide) were mixed together. The ESS was mixed with the solvent at a 1:1 ratio v/v. The catalyst was added at 5% w/w with the resin. Mixing proceeded overnight at 40° C. to completely dissolve the catalyst into the reaction mixture. The reaction mixture turned amber color by morning.

The reaction mixture was charged and sealed in a Parr Pressure Reactor (6 L Series 4586) pressure reaction vessel. Approximately 0.68 kg of CO$_2$ was charged to the reactor. The reactor mixer was run at 120 rpm. The starting temperature ramping was set to 25% to reach a reaction temperature of 140° C. The reaction was run for 50 hrs. The maximum pressure reached was 1114.5 psi approximately 2 hrs into the reaction.

The reacted mixture had turned to a darker amber color. No sludge or precipitate was present. The reacted mixture was washed once with brine solution and twice more with water then dried. Solvent removal was studied by increasing evaporation time. Solvent was removed with a rotary evaporator.

Figure 3:
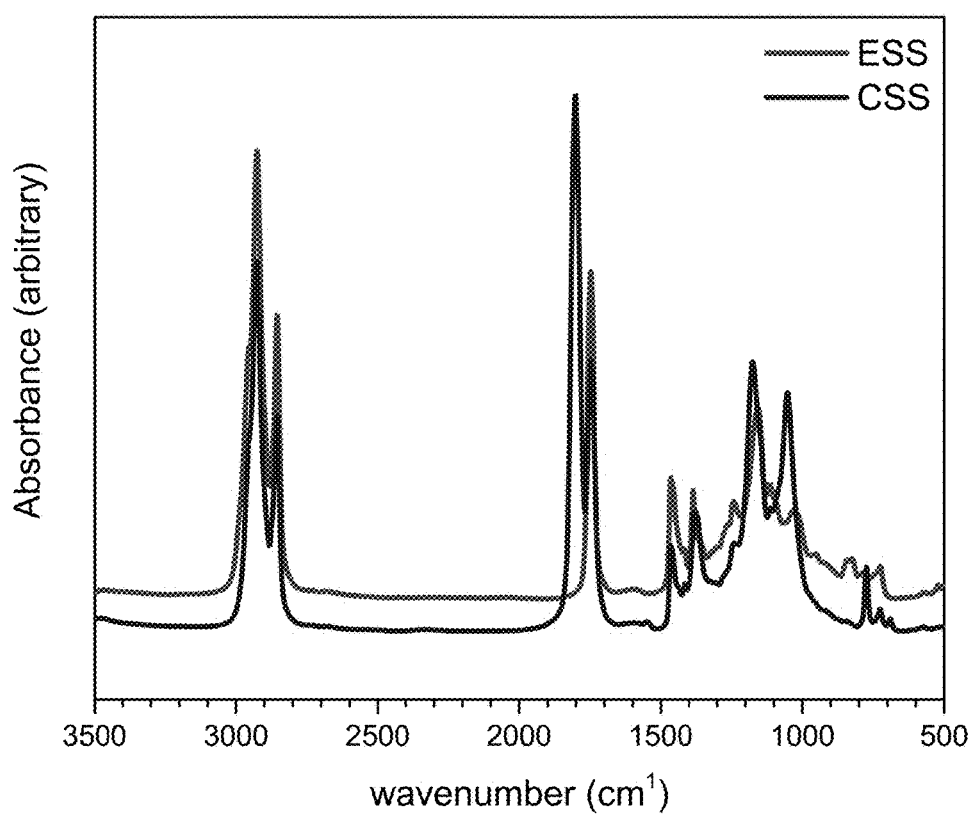
FIG. 3 is an FTIR spectra of epoxidized sucrose soyate (ESS) and carbonated sucrose soyate (CSS).
Figure 4:
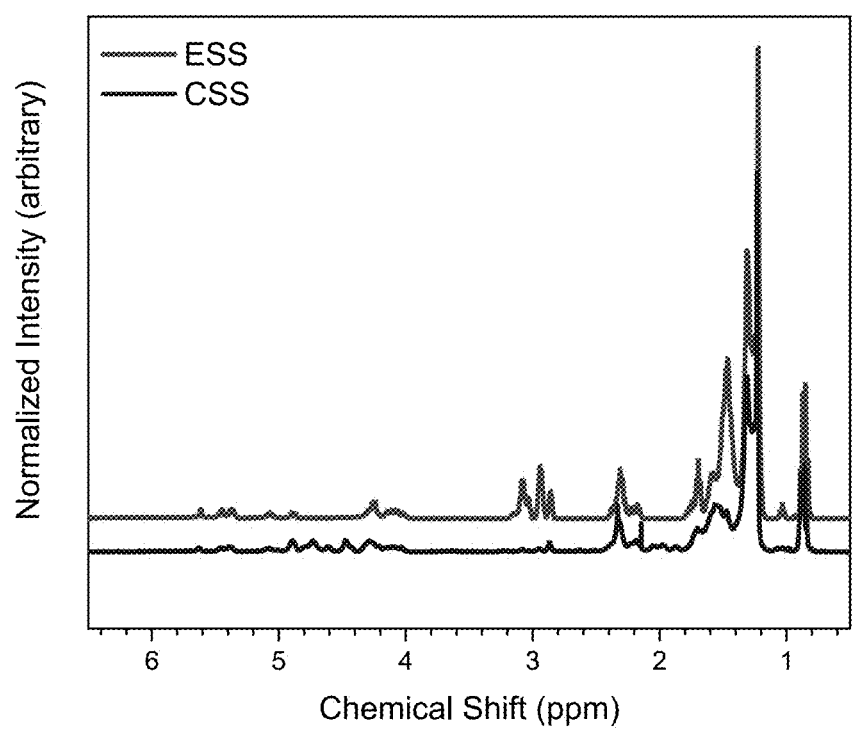
FIG. 4 is a proton NMR spectra of epoxidized sucrose soyate (ESS) and carbonated sucrose soyate (CSS).

Characterization of ESS and the CSS of the invention using FTIR and $^1$H-NMR showed the conversion of the oxirane group in ESS to the cyclic carbonate group in the CSS. See FIGS. 3 and 4.

The resin characterization of ESS and the CSS resins, including their density (g/cm$^3$), molecular weight (GPC), molecular weight (m/z), and viscosity (Pa·s), is shown in Table 1.

TABLE 1

Properties of epoxidized sucrose soyate (ESS) and carbonated sucrose soyate (CSS)

| | Density (g/cm$^3$) | Molecular Weight (GPC) | Molecular Weight (MS) | Epoxy Functionality ($^1$H-NMR) | Viscosity (Pa · s) |
|---|---|---|---|---|---|
| ESS | 1.150 | 3017 | 2628 | 11.4 | 1.9 ± 0.3 |
| CSS | 1.090 | 3617 | 3024 | 2.4 | 2324 ± 2 |

Figure 5:
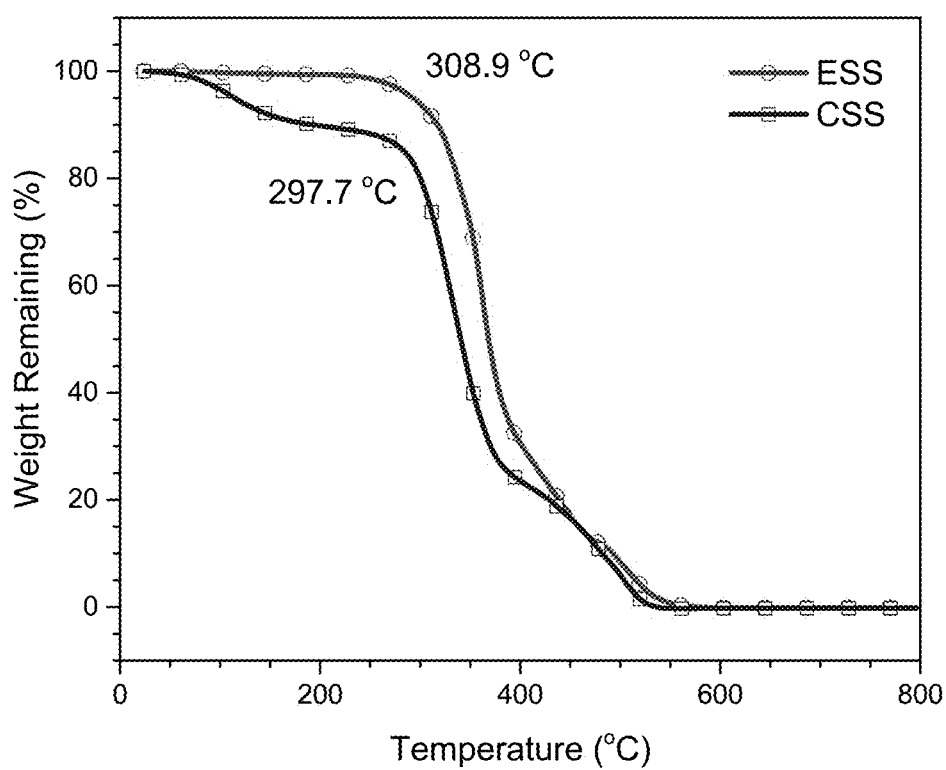
FIG. 5 depicts the thermogravimetric analysis (TGA) of epoxidized sucrose soyate (ESS) and carbonated sucrose soyate (CSS).
Figure 6:
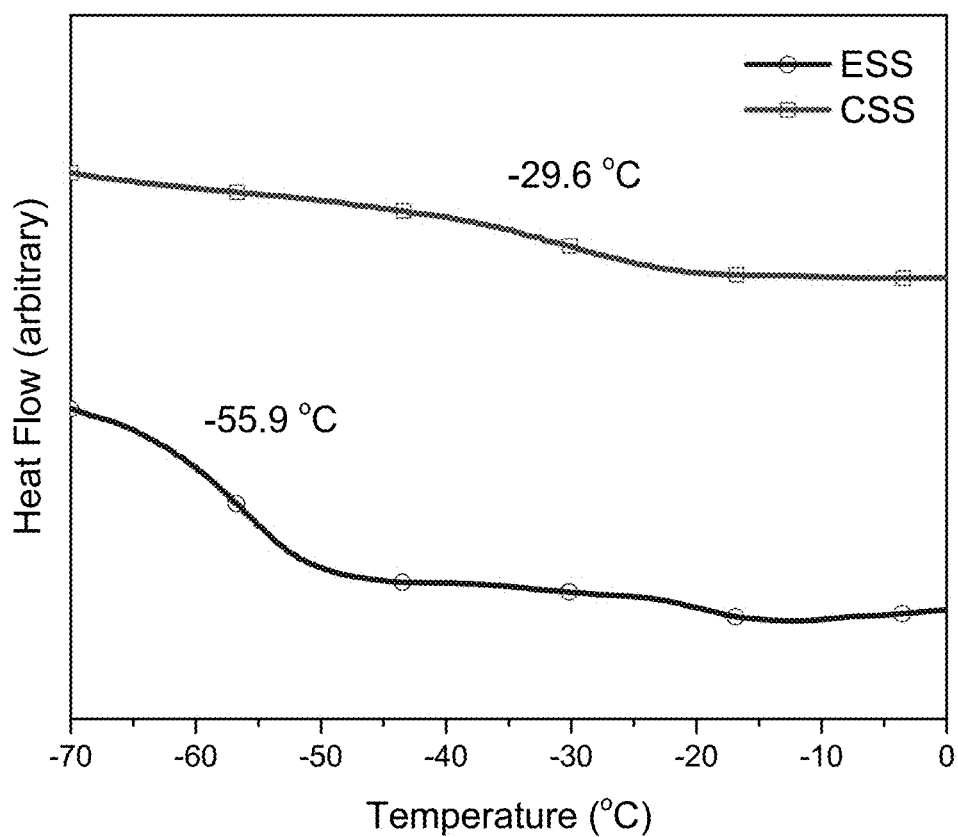
FIG. 6 depicts the differential scanning calorimetry (DSC) scan of epoxidized sucrose soyate (ESS) and carbonated sucrose soyate (CSS).

The TGA and DSC of ESS and the CSS of the invention describing the thermal stability and $T_g$ of the resins are shown in FIGS. 5 and 6.

Example 2—Coating Compositions

Coating compositions of the invention were prepared by reacting the CSS with aminoethylpiperazine (AEP) or bis (4-aminocyclohexyl)methane (PACM).

The conventional characterization of the CSS/AEP and CSS/PACM coatings of the invention, including its thickness (μm), König pendulum (sec), pencil hardness (scratch), pencil hardness (gouge), MEK DRs (cycles), crosshatch tap pull-off (adhesion), forward impact (in-lb), reverse impact (in-lb), and mandrel bending (% break), is shown in Table 2.

TABLE 2

Properties of coatings cured using aminoethyl piperazine (AEP) and bis(4-aminocyclohexyl)methane (PACM)

| Characterization Method | CSS/AEP | CSS/PACM |
|---|---|---|
| Thickness (μm) | 36.7 ± 2.5 | 37.2 ± 3.9 |
| König Pendulum (sec) | 63 ± 2 | 75 ± 5 |
| Pencil Hardness (scratch) | 6B | 4B |
| Pencil Hardness (gouge) | B | HB |
| MEK DRs (cycles) | 96 | 8 |
| Crosshatch Tape pull-off (adhesion) | 5B | 5B |
| Forward Impact (in-lb) | +172 | 8 |
| Reverse Impact (in-lb) | +172 | <4 |
| Mandrel Bending (% break) | 0 | 89 |

Figure 7:
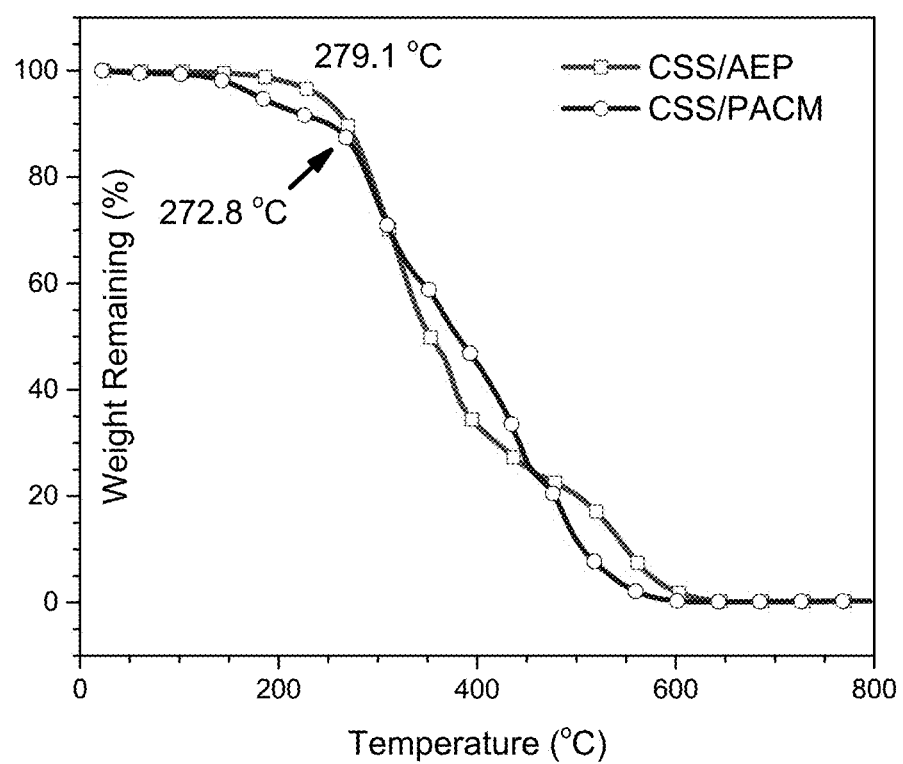
FIG. 7 depicts the thermogravimetric analysis (TGA) of carbonated sucrose soyate (CSS) cured with amino ethyl piperazine (AEP) and bis(4-aminocyclohexyl)methane (PACM).
Figure 8:
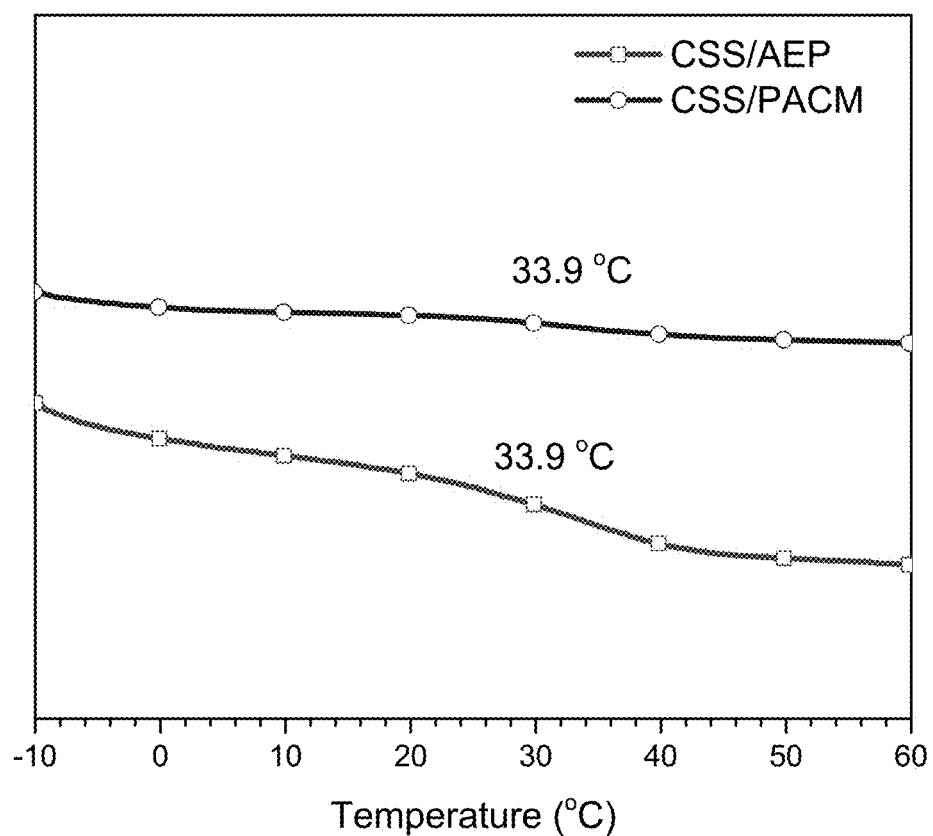
FIG. 8 depicts the differential scanning calorimetry of cured coatings from CSS with amino ethyl piperazine (AEP) and bis(4-aminocyclohexyl)methane (PACM).
Figure 9:
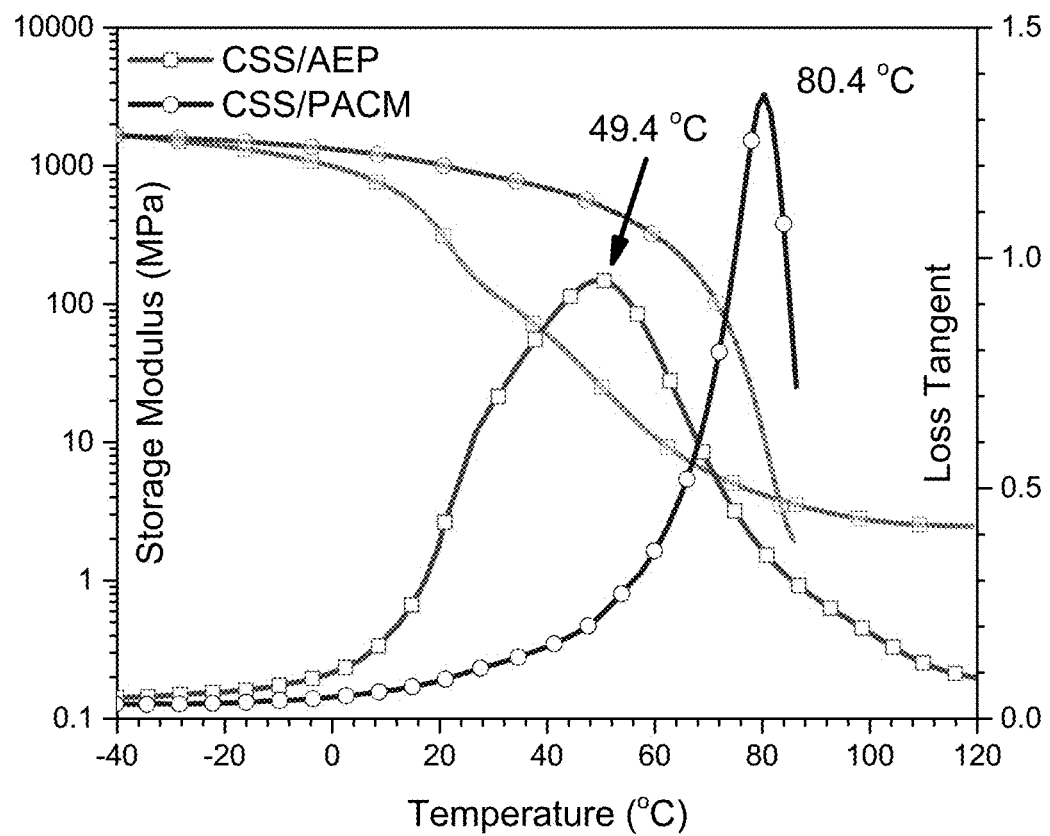
FIG. 9 depicts the storage modulus and loss tangent from dynamic mechanical analysis (DMA) of carbonated sucrose soyate (CSS) cured with amino ethyl piperazine (AEP) and bis(4-aminocyclohexyl)methane (PACM).

The TGA, DSC, and DMA of a coating containing the CSS of the invention describing the thermal stability and $T_g$ of the coatings are shown in FIGS. 7, 8, and 9.

Example 3—Coating Compositions

Coatings compositions of the invention were prepared by curing CSS with aminoethyl piperazine (AEP), 2-methyl-1,5-pentanediamine (MPDA), diethylene triamine (DETA), and tris(2-aminoethyl) amine (TAEA). The coatings properties are listed in Table 3. For comparison, coatings were prepared using carbonated soybean oil (CSBO).

TABLE 3

Properties of CSS and CSBO cured with several amines

| | CSS/AEP | CSBO/AEP | CSS/MPDA | CSBO/MPDA | CSS/DETA | CSBO/DETA | CSS/TAEA | CSBO/TAEA |
|---|---|---|---|---|---|---|---|---|
| Thickness (μm) | 24 ± 5 | 22 ± 3 | 22 ± 3 | 23 ± 4 | 32 ± 5 | 27 ± 4 | 32.3 ± 6 | 31 ± 5 |
| König (s) | 11 ± 1 | 12 ± 1 | 8 ± 2 | 9.6 ± 0.5 | 9.9 ± 0.6 | 10.0 ± 0.8 | 26 ± 2 | 34 ± 1 |
| Crosshatch | 5B | 5B | 5B | 5B | 5B | 5B | 5B | 5B |
| Pencil Gouge | 4B | 4B | 4B | 4B | 4B | 4B | 4B | HB |
| Pencil Scratch | 8B | 6B | 5B | 6B | 7B | 6B | 6B | 4B |
| MEK DRs | 6 | 40 | 3 | 80 | 100 | 70 | 250 | 320 |
| Mandrel (%) | 0 | 0 | 0 | 0 | 0 | 0 | 0 | 0 |
| Forward Impact (in-lbs) | +172 | +172 | 172 | 172 | 172 | 172 | 172 | 172 |
| Reverse Impact (in-lbs) | +172 | +172 | 172 | 172 | 172 | 172 | 172 | 172 |
| Gloss (GU) 20°, 60°, 85° | 78.5 ± 0.9 | 80.3 ± 0.2 | 68 ± 12 | 74 ± 2 | 63 ± 2 | 64.4 ± 0.5 | 81.1 ± 0.7 | 1.4 ± 0.4 |
| | 86.7 ± 0.4 | 87.7 ± 0.2 | 82 ± 5 | 85.8 ± 0.2 | 83.3 ± 0.6 | 83.6 ± 0.2 | 88.1 ± 0.1 | 23 ± 2 |
| | 98 ± 1 | 98.0 ± 0.3 | 95 ± 3 | 98.1 ± 0.3 | 98.0 ± 0.5 | 98.1 ± 0.4 | 98.8 ± 0.2 | 89.0 ± 0.6 |

The claimed invention is:

1. A bio-based resin having a plurality of cyclic carbonate groups comprising the reaction product of:
   a) an epoxidized sucrose fatty acid ester resin, and
   b) carbon dioxide,
   wherein a) and b) are reacted under conditions sufficient to carbonylate a plurality of the oxirane groups of the epoxidized sucrose fatty acid ester resin and optionally in the presence of a catalyst or of a solvent,
   wherein 25%-90% of the epoxide groups of the epoxidized sucrose fatty acid ester resin are carbonylated.

2. The resin of claim 1, wherein the epoxidized sucrose fatty acid ester resin is epoxidized sucrose soyate.

3. The resin of claim 1, wherein substantially all of the epoxide groups of the epoxidized sucrose fatty acid ester resin are carbonylated.

4. A curable composition comprising:
   a) the bio-based resin of claim 1;
   b) an alkyl amine curing agent having two or more reactive amine groups; and
   c) optionally, a catalyst.

5. The curable composition of claim 4, wherein the alkyl amine curing agent having two or more reactive amine groups is selected from aminoethylpiperazine (AEP), 2-methyl1,5-pentanediamine (MPDA), diethylene triamine (DETA), and tris(2-aminoethyl)amine (TAEA), and bis(4-aminocyclohexyl)methane (PACM).

6. An article coated with the curable coating composition of claim 4.

7. The resin of claim 1, wherein 25% of the epoxide groups of the epoxidized sucrose fatty acid ester resin are carbonylated.

8. The resin of claim 1, wherein 55% of the epoxide groups of the epoxidized sucrose fatty acid ester resin are carbonylated.

9. The resin of claim 1, wherein 75% of the epoxide groups of the epoxidized sucrose fatty acid ester resin are carbonylated.

10. The resin of claim 1, wherein 90% of the epoxide groups of the epoxidized sucrose fatty acid ester resin are carbonylated.

11. A method for producing a resin having a plurality of cyclic carbonate groups comprising the step of:
    contacting an epoxidized sucrose fatty acid ester resin with carbon dioxide under conditions sufficient to carbonylate a plurality of the oxirane groups of the epoxidized sucrose fatty acid ester resin, and optionally in the presence of a catalyst or of a solvent,
    wherein 25%-90% of the epoxide groups of the epoxidized sucrose fatty acid ester resin are carbonylated.

12. The method of claim 11, wherein the epoxidized sucrose fatty acid ester resin is epoxidized sucrose soyate.

13. The method of claim 11, wherein the catalyst is tetra-butyl ammonium bromide.

14. The method of claim 11, wherein the solvent is toluene.

15. The method of claim 11, wherein 25% of the epoxide groups of the epoxidized sucrose fatty acid ester resin are carbonylated.

16. The method of claim 11, wherein 55% of the epoxide groups of the epoxidized sucrose fatty acid ester resin are carbonylated.

17. The method of claim 11, wherein 75% of the epoxide groups of the epoxidized sucrose fatty acid ester resin are carbonylated.

18. The method of claim 11, wherein 90% of the epoxide groups of the epoxidized sucrose fatty acid ester resin are carbonylated.

* * * * *